(12) United States Patent
Baumert et al.

(10) Patent No.: US 9,894,459 B2
(45) Date of Patent: Feb. 13, 2018

(54) SPATIALLY AWARE SMART DEVICE PROVISIONING

(71) Applicant: Digi International Inc., Minnetonka, MN (US)

(72) Inventors: Joel Baumert, Ellicott City, MD (US); Aaron Samuel Kurland, Minneapolis, MN (US)

(73) Assignee: Digi International Inc., Minnetonka, MN (US)

( * ) Notice: Subject to any disclaimer, the term of this patent is extended or adjusted under 35 U.S.C. 154(b) by 0 days.

(21) Appl. No.: 15/159,628

(22) Filed: May 19, 2016

(65) Prior Publication Data

US 2016/0269851 A1  Sep. 15, 2016

Related U.S. Application Data

(62) Division of application No. 13/420,218, filed on Mar. 14, 2012, now Pat. No. 9,351,094.

(51) Int. Cl.
*H04W 4/00* (2018.01)
*H04L 12/28* (2006.01)
(Continued)

(52) U.S. Cl.
CPC .......... *H04W 4/001* (2013.01); *H04B 5/0031* (2013.01); *H04L 12/2803* (2013.01);
(Continued)

(58) Field of Classification Search
CPC ....... H04W 4/001; H04W 4/02; H04W 64/00; H04W 64/003; H04W 76/02;
(Continued)

(56) References Cited

U.S. PATENT DOCUMENTS 6,515,988 B1 * 2/2003 Eldridge ............. G06F 15/0225
370/389
6,711,474 B1 * 3/2004 Treyz ..................... G01C 21/26
455/414.1
(Continued)

OTHER PUBLICATIONS

U.S. Patent and Trademark Office, "Notice of Allowance", "from U.S. Appl. No. 13/420,218", dated Jan. 15, 2016, pp. 1-18, Published in: US.
(Continued)

*Primary Examiner* — Hai V Nguyen
(74) *Attorney, Agent, or Firm* — Fogg & Powers LLC

(57) ABSTRACT

Various system and techniques for spatially aware smart device provisioning are described herein. Location data indicating a physical location of the configuration device can be received from the configuration device. A subset of one or more smart devices can be received from a device management module. The subset of one or more smart devices can be based on stored physical locations of each smart device of one or more smart devices and a predetermined area. The subset of smart devices can be presented to the configuration device. The configuration device can present the subset of smart devices to a user and accept a user selection of a smart device from the subset of smart devices to provision. The user selection of the smart device can be received. The smart device can be provisioned based on the user selection.

20 Claims, 5 Drawing Sheets

(51) Int. Cl.
*H04W 64/00* (2009.01)
*H04W 76/02* (2009.01)
*H04W 4/02* (2018.01)
*H04B 5/00* (2006.01)
*H04L 29/08* (2006.01)
*G06F 3/0482* (2013.01)
*G06F 3/0484* (2013.01)
*G08B 25/08* (2006.01)

(52) U.S. Cl.
CPC ............... *H04L 67/16* (2013.01); *H04W 4/02* (2013.01); *H04W 64/00* (2013.01); *H04W 64/003* (2013.01); *H04W 76/02* (2013.01); *G06F 3/0482* (2013.01); *G06F 3/04842* (2013.01); *G08B 25/08* (2013.01)

(58) Field of Classification Search
CPC ... H04B 5/0031; H04L 12/2803; H04L 67/16; G06F 3/0482; G06F 3/04842; G08B 25/08
USPC .......................................................... 455/41.1
See application file for complete search history.

(56) References Cited

U.S. PATENT DOCUMENTS

| | | | | |
|---|---|---|---|---|
| 6,985,745 B2* | 1/2006 | Quaid | ............... | G01S 5/0252 455/456.1 |
| 7,248,880 B2* | 7/2007 | Gheorghiu | ............ | H04L 29/06 455/456.1 |
| 7,379,891 B1* | 5/2008 | Donner | ................ | G06Q 10/02 235/382 |
| 7,415,424 B1* | 8/2008 | Donner | ................ | G06Q 10/02 235/382 |
| 7,424,532 B1* | 9/2008 | Subbiah | .............. | H04L 41/0803 707/999.101 |
| 7,711,392 B2* | 5/2010 | Brown | ................ | H04M 1/7253 455/41.2 |
| 7,812,718 B1* | 10/2010 | Chan | ................... | G01S 5/0289 340/539.13 |
| 7,813,308 B2* | 10/2010 | Reddy | ................ | H04L 41/0843 370/312 |
| 8,073,565 B2* | 12/2011 | Johnson | ............. | H04W 76/021 455/404.2 |
| 8,081,957 B2* | 12/2011 | O'Neil | ................ | H04N 7/17318 370/338 |
| 8,090,409 B2* | 1/2012 | Brown | ................ | H04M 1/7253 455/41.2 |
| 8,112,552 B2* | 2/2012 | Lee | ....................... | G06F 9/4411 709/226 |
| 8,131,859 B2* | 3/2012 | Fujii | ..................... | H04W 48/16 370/310 |
| 8,185,887 B2* | 5/2012 | Hattori | ................ | G06F 3/1204 717/174 |
| 8,250,218 B2* | 8/2012 | Watanabe | .............. | G06F 3/1212 348/207.2 |
| 8,261,259 B2* | 9/2012 | Hattori | ................ | G06F 3/1204 708/173 |
| 8,386,655 B2* | 2/2013 | Luers | .................... | H04W 4/02 455/456.1 |
| 8,458,374 B1* | 6/2013 | Luers | .................... | H04W 4/02 455/456.1 |
| 8,493,605 B2* | 7/2013 | Wada | .................. | G06F 3/1204 358/1.1 |
| 8,495,617 B2* | 7/2013 | Kim | ...................... | H04W 8/24 717/173 |
| 8,503,983 B2* | 8/2013 | Chen | ................... | H04W 12/06 455/411 |
| 8,588,809 B2* | 11/2013 | Seavey | ................ | G06Q 10/06 455/420 |
| 8,666,381 B2* | 3/2014 | Inlow | ................ | H04M 3/42153 379/15.03 |
| 8,756,305 B2* | 6/2014 | Hirose | ................... | H04L 29/06 358/1.15 |
| 8,838,082 B2* | 9/2014 | Vendrow | ........... | H04M 3/42348 455/417 |
| 8,863,240 B2* | 10/2014 | Tapia | ..................... | G06F 21/31 379/201.12 |
| 8,874,098 B2* | 10/2014 | Inlow | ................ | H04M 3/42153 379/15.03 |
| 8,892,118 B2* | 11/2014 | Garin | .................... | G01C 21/206 370/388 |
| 9,124,719 B2* | 9/2015 | Inlow | ................ | H04M 3/42153 |
| 9,134,944 B1* | 9/2015 | Platt | ....................... | G06F 3/1204 |
| 9,148,763 B2* | 9/2015 | Gupta | ...................... | H04W 4/04 |
| 9,351,094 B2* | 5/2016 | Baumert | ................ | H04W 4/001 |
| 9,451,573 B2* | 9/2016 | Erickson | ............ | H04W 52/0212 |
| 9,454,744 B2* | 9/2016 | Imming | ................. | G06Q 10/08 |
| 9,531,704 B2* | 12/2016 | Erickson | ............ | H04L 45/741 |
| 9,578,621 B2* | 2/2017 | Forstall | ................ | H04W 4/02 |
| 9,622,042 B2* | 4/2017 | Gupta | .................... | H04W 4/028 |
| 9,629,193 B2* | 4/2017 | Erickson | ............ | H04W 76/023 |
| 2001/0018349 A1* | 8/2001 | Kinnunen | ............... | H04W 4/02 455/456.3 |
| 2002/0123325 A1* | 9/2002 | Cooper | ............... | H04L 63/0492 455/411 |
| 2003/0050077 A1* | 3/2003 | Takeuchi | .................. | G01S 5/12 455/456.1 |
| 2003/0050079 A1* | 3/2003 | Tsunehara | ............. | H04W 64/00 455/456.1 |
| 2003/0114168 A1* | 6/2003 | Shi | ........................... | H04W 4/02 455/456.1 |
| 2003/0134645 A1* | 7/2003 | Stern | ....................... | H04W 4/02 455/456.1 |
| 2004/0192332 A1* | 9/2004 | Samn | ..................... | H04W 64/00 455/456.1 |
| 2004/0203864 A1* | 10/2004 | DiBuduo | ................ | H04W 48/20 455/456.1 |
| 2004/0257273 A1* | 12/2004 | Benco | ..................... | H04M 3/42 342/357.43 |
| 2005/0094610 A1* | 5/2005 | de Clerq | ................ | G05B 15/02 370/338 |
| 2005/0148342 A1* | 7/2005 | Sylvain | ................... | H04W 4/02 455/456.3 |
| 2005/0250491 A1* | 11/2005 | Roy | ........................ | H04L 29/06 455/428 |
| 2005/0288033 A1* | 12/2005 | McNew | .................. | G01S 5/021 455/456.1 |
| 2006/0109811 A1* | 5/2006 | Schotten | ................. | G01S 1/68 370/328 |
| 2006/0258371 A1* | 11/2006 | Krishnamurthi | ........ | H04W 4/02 455/456.1 |
| 2007/0036118 A1* | 2/2007 | Shaffer | ................... | H04W 4/08 370/338 |
| 2007/0067823 A1* | 3/2007 | Shim | ..................... | H04L 63/101 726/2 |
| 2007/0093237 A1* | 4/2007 | Bayne | ................... | H04W 64/00 455/414.2 |
| 2008/0014984 A1* | 1/2008 | Brown | .................. | H04M 1/7253 455/552.1 |
| 2009/0024765 A1* | 1/2009 | Luers | ...................... | H04W 4/02 710/9 |
| 2010/0052843 A1* | 3/2010 | Cannistraro | ........... | G08C 17/00 340/3.32 |
| 2010/0159876 A1* | 6/2010 | Brown | .................. | H04M 1/7253 455/410 |
| 2010/0323657 A1* | 12/2010 | Barnard | ................ | H04M 1/663 455/404.1 |
| 2011/0086625 A1* | 4/2011 | Inlow | ................ | H04M 3/42153 455/418 |
| 2011/0171907 A1* | 7/2011 | Jolivet | ................ | H04L 63/0492 455/41.1 |
| 2011/0265151 A1* | 10/2011 | Furlan | ................. | H04L 12/2809 726/4 |
| 2012/0061480 A1* | 3/2012 | Deligiannis | .......... | F24F 11/0012 236/51 |
| 2012/0083937 A1* | 4/2012 | Kong | ................... | G06Q 50/06 700/295 |

(56) References Cited

U.S. PATENT DOCUMENTS

| | | | |
|---|---|---|---|
| 2012/0101952 A1* | 4/2012 | Raleigh | G06Q 30/016 705/304 |
| 2012/0102556 A1* | 4/2012 | Tapia | G06F 21/31 726/7 |
| 2012/0329474 A1* | 12/2012 | Seavey | G06Q 10/06 455/456.1 |
| 2013/0040572 A1* | 2/2013 | Berrett | H04W 4/023 455/41.2 |
| 2013/0053007 A1* | 2/2013 | Cosman | G06F 3/017 455/414.3 |
| 2013/0060351 A1* | 3/2013 | Imming | G06Q 10/08 700/13 |
| 2013/0132540 A1* | 5/2013 | Luers | H04W 4/02 709/222 |
| 2013/0181819 A1* | 7/2013 | McLaren | H04W 4/008 340/10.4 |
| 2013/0241697 A1* | 9/2013 | Baumert | H04W 4/001 340/8.1 |
| 2013/0247117 A1* | 9/2013 | Yamada | G08C 17/02 725/93 |
| 2014/0149915 A1* | 5/2014 | Inlow | H04M 3/42153 715/780 |
| 2014/0203948 A1* | 7/2014 | Raskar | H04L 1/00 340/870.02 |
| 2015/0044991 A1* | 2/2015 | Inlow | H04M 3/42153 455/406 |
| 2015/0169946 A1* | 6/2015 | Needleman | G06K 9/00295 382/118 |
| 2017/0161752 A1* | 6/2017 | Siravuri | G06Q 30/016 |

OTHER PUBLICATIONS

U.S. Patent and Trademark Office, "Office Action", "from U.S. Appl. No. 13/420,218", dated Jul. 6, 2015, pp. 1-13, Published in: US.

U.S. Patent and Trademark Office, "Restriction Requirement", "from U.S. Appl. No. 13/420,218", dated Jan. 5, 2015, pp. 1-6, Published in: US.

* cited by examiner

SPATIALLY AWARE SMART DEVICE PROVISIONING

RELATED APPLICATIONS

This application is a divisional of and claims the benefit of priority under 35 U.S.C. §120 to U.S. patent application Ser. No. 13/420,218, filed on Mar. 14, 2012, currently pending, which is incorporated herein by reference in its entirety.

TECHNICAL FIELD

This document pertains generally to smart device provisioning, and more particularly, but not by way of limitation, to spatially aware smart device provisioning.

BACKGROUND

Smart devices can include reporting, controlling, and hybrid devices that are part of a network. Reporting devices can include such things as thermometers, pressure sensors, motions detectors, position tracker etc. Controlling devices can include such things as motor controllers, valve actuators, etc. Hybrid devices can include an aspect of reporting and control, such as a thermostat or an intruder alarm.

One or more smart devices can be used to institute an application. For example, a motion detector and a cellular telephone reporting device can be used to create an alarm system. Using smart devices to institute an application generally requires provisioning (e.g., configuring) the smart devices. Smart device provisioning generally entails configuring network, reporting, security, or other parameters of the smart device.

Smart device provisioning is generally carried out by an original equipment manufacturer (OEM), a retailer, or by a user (e.g., an installer). Generally, users provision a smart device by manipulating buttons on the device housing and using a limited visual or audible feedback mechanism. For example, the smart device can have a limited digital display, such as ten numbers, and a button or two. The buttons can be depressed to select a mode (e.g., modify network parameters) and then change the data via a sequences of button pushes or holds.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
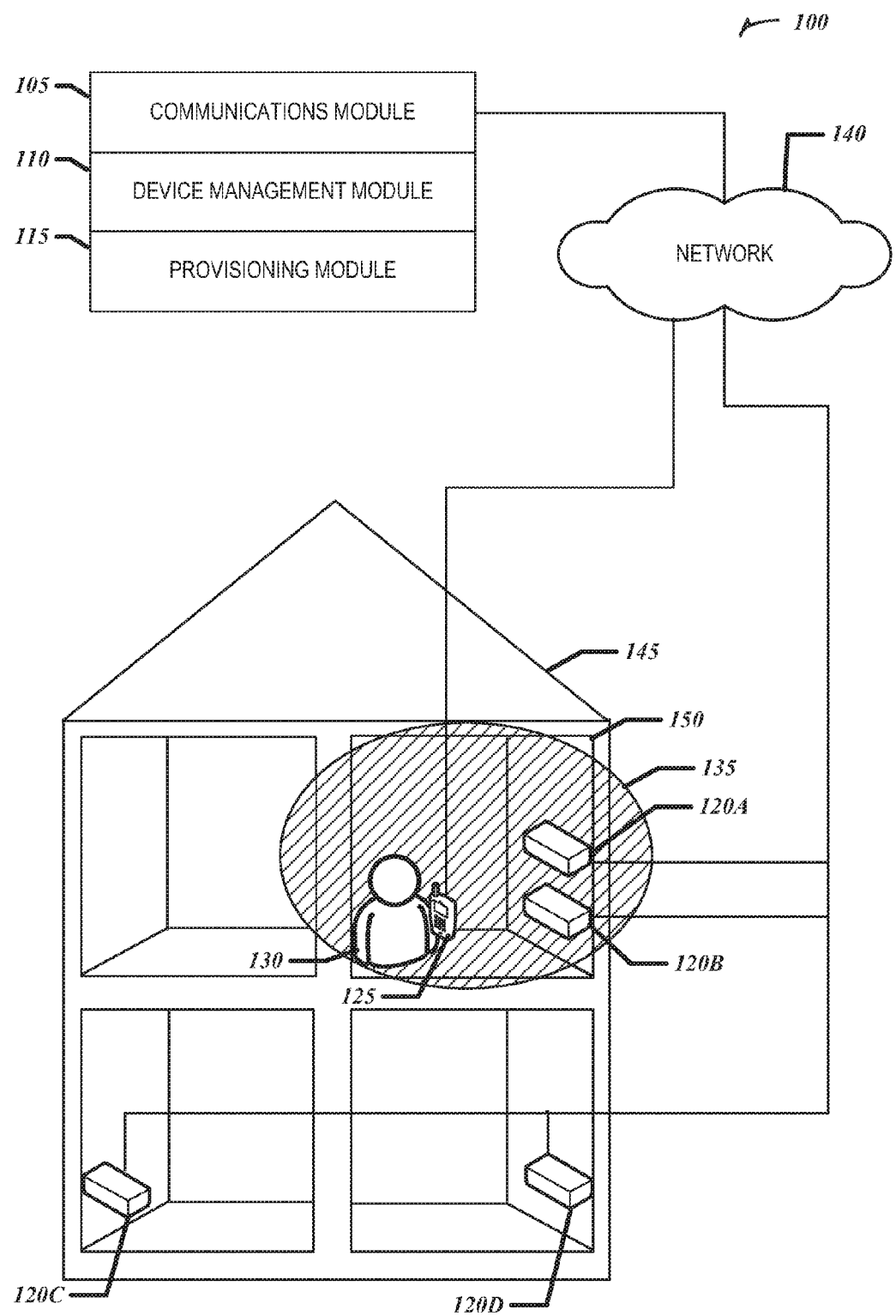
FIG. 1 illustrates an example of a system for spatially aware smart device provisioning, according to an embodiment.

OEM or retailed provisioning of smart devices can lead to inefficiencies including greater purchasing cost and decreased flexibility to adapt installed smart device to the environment. User provisioning has generally suffered from hard to use and error prone interfaces. The previous described button pushing procedure can become tedious and a user can be confused as to what is be provisioned at any given time.

A configuration device can be used to enrich the user's experience provisioning the smart device. Example configuration devices can include smart phones, personal digital assistants (PDAs), netbooks, laptops, etc. For example, a rich graphical user interface (GUI) can be provided by the user's smart phone and interface with the smart device for provisioning purposes. For this to work, however, both the smart phone and the smart device must be configured to directly interface with each other. This can lead to the addition of hardware and software and thus increase costs.

Smart devices can be configured to attach to a default network and communicate with a device management module (e.g., a server or cloud service). For example, a smart device can connect to a cloud service via a wireless network. The smart device can use a default parameter set to accomplish this communication. The configuration device can also connect to the cloud service through the internet, for example. The cloud service can provide a communications link between the smart device and the configuration device. Thus, no additional hardware or software is needed for direct connection between the two devices. In an example, this is known as cloud based smart device provisioning. Cloud based smart device provisioning connects two devices based on inputs received from either or both of the two devices, as well as possibly other data sources. Generally, the user identifies the smart device being provisioned. This identification can be as simple as the user entering the smart device's serial number into a provisioning program.

A user typing in a smart device's identification can also include problems. For example, serial numbers can be long and the typically small user interface can be error prone. Providing the configuration device with a list of unprovisioned smart devices and allowing the user to select a smart device to provision can solve this problem. However, a great many unprovisioned smart devices can be connected to the cloud service at any given time causing the listing of unprovisioned smart devices to be very long.

The list of smart devices can be constrained using the physical location of the unprovisioned smart devices and the configuration device. For example, a physical location can be stored for smart devices. The configuration device can send location data indicating its physical location. The device management module can return a subset of the smart devices that are located near to the configuration device. In an example, "near" can mean within a predetermined distance. In an example, "near" can mean in the same building, or in the same room, as the configuration device. Additional security features can also be implemented to prevent provisioning of smart devices by persons without access to the devices.

In cases where the device management module does not have physical location information for a smart device, the configuration device can be configured to read an electronic representation of an identification feature of the smart device. For example, the configuration device can scan, or take a picture of, a barcode on the smart device representing the smart device's serial number. Other techniques such as radio frequency identification (RFID), near-field communications (NFC), or near-field magnetic resonance communications (NFMRC) techniques can be used. The configuration device can communicate the smart device identification information to the device management module along with location data. The device management module can then create, or update, a physical location data segment for the smart device.

FIG. 1 illustrates an example of a system 100 for spatially aware smart device provisioning. The system 100 can include a communications module 105, a device management module 110, and a provisioning module 115. These modules can be communicatively coupled to smart devices 120A, 120B, 120C, and 120D via network 140. Configuration device 125, for use by user 130, can be communicatively coupled to communications module 105, device management module 110, and provisioning module 115 via the network 140.

The communications module 105 can be configured to communicate with the configuration device 125 and the smart devices 120A, 120B, 120C, and 120D. In an example, the communications module 105 can be configured to communicate with the configuration device 125 in a first protocol and one or more of the smart devices 120A, 120B, 120C, and 120D using a second, different, protocol. For example, the communications module 105 can present a web service to communicate with the configuration device 125. The communications module 105 can separately present a device specific streaming protocol to communicate with, for example, smart device 120A.

The device management module 110 can be configured to store a physical location for each of the smart devices smart devices 120A, 120B, 120C, and 120D. The device management module 110 can be any system or data structure configured to store and associate a physical location with a smart device 120. The device management module 110 is configured to communicate with other entities, such as the communications module 105 or the provisioning module 115. In an example, the device management module 110 can be a cloud storage system, database, filesystem, or flat file. In an example, the device management module 110 can be configured to receive smart device physical location data directly from a smart device 120. Further details in this regard are discussed with respect to FIG. 2.

The provisioning module 115 can be configured to receive location data from the configuration device 125. The location data can indicate the physical location of the configuration device 125. In an example, the location data can be a geographical coordinate, such as global positioning system (GPS) coordinates. In an example, the location data can include an elevation. In an example, the location data can include an identification of a structure 145. In an example, the physical location can include a structural feature 150 of the structure (e.g., a room, portal, window, etc.). For example, a structure's entrance can include an RFID tag that uniquely identifies the structure 145. The configuration device 125 can interrogate the RFID tag when passing through the entrance. The configuration device 125 can transmit the RFID tag data to the provisioning module 115 as the location data.

The provisioning module 115 can be configured to receive a subset (e.g., the smart devices 120A and 120B) of the smart devices 120A, 120B, 120C, 120D from the device management module 110. The subset can be based on the stored physical location for each of the smart devices 120A, 120B, 120C, 120D and a predetermined area 135 where the physical location of the configuration device 125 is located within the predetermined area 135. In an example, the predetermined area 135 can be a geometric shape (e.g., a circle, oval, square, three dimensional equivalents, etc.) oriented with respect to the configuration device's physical location. For example, the predetermined area 135 can be a sphere centered at the configuration device's physical location. In an example, the predetermined area 135 can be a known area. For example, the predetermined area 135 can be a room within the structure 145. In this example, the predetermined area 135 is defined with respect to known landmarks, such as the room geometry within the structure 145.

The provisioning module 115 can be configured to present the subset of smart devices 120A, 120B, 120C, 120D to the configuration device 125 via the communications module 105. The configuration device 125 can be configured to present the subset of smart devices 120A, 120B, 120C, 120D to the user 130. The configuration device 125 can be configured to accept a user selection of a smart device 120 from the subset of smart devices 120A, 120B, 120C, 120D to provision.

In an example, to present the subset of smart devices 120A, 120B, 120C, 120D to the configuration device 125, the provisioning module 115 can be configured to receive an initial selection of a smart device 120 from the configuration device 125. The initial selection if the smart device 120 can be made by the user 130. In this example, the provisioning module 115 can be configured to transmit a command to the smart device 120 to perform an identification action. Additional details concerning the identification action are discussed with respect to FIG. 2.

The provisioning module 115 can be configured to receive the user selection of the smart device 120. In an example, to receive the user selection of the smart device 120, the provisioning module 115 can be configured to receive a confirmed selection from the configuration device 125. The confirmed selection can be a user confirmation of the initial selection. Additional details concerning this interaction, and the configuration device 125, are discussed with respect to FIG. 3.

The provisioning module 115 can be configured to provision the smart device 120 based on the user selection of the smart device. For example, the provisioning module 115 can access provisioning information stored, for example, by the device management module 110 and directly provision the smart device 120. In an example, the provisioning module 115 is configured to receive selection of a provisioning profile from the configuration device 125 to apply to the smart device 120. In an example, the provisioning module 115 can connect the configuration device 125 to the smart device 120 such that the configuration device 125 can apply the provisioning parameters to the smart device 120. In an example, to provision the smart device 120 based on the user selection of the smart device 120, the provisioning module 115 can be configured to verify that the configuration device 125 is within the predetermined area 135 before proceeding with a provisioning operation on the smart device. This can provide additional security by restricting provisioning capability to a user 130 that is proximate (e.g., within the predetermined area) to the smart device.

Situations in which a smart device 120 cannot, or has not, communicated its physical location to the device management module 110, or if the device management module 110 simply does not have a physical location, the provisioning module 115 can be configured to provide this information. The provision module can be configured to receive an identification of the smart device 120 from the configuration device 125 via the communications module 105. In an example, the identification of the smart device 120 is an electronic representation of an identification feature of the smart device 120. In an example, the identification feature can be a barcode. In an example, the identification feature can be a serial number. The identification feature can include, for example, a model number, media access layer (MAC) address, or other feature of the smart device 120 that can be used to distinguish it from other smart devices.

In an example, the electronic representation of the identification feature can be a photograph. In an example, the electronic representation can be a data block or stream, read, for example, by the configuration device 125. The configuration device 125 can be configured to use RFID, NFC, NFMRC, or other short range communication technologies to interrogate the smart device 120 to get the data block or stream.

The provisioning module 115 can be configured to receive location data indicating a physical location of the configuration device 125. The provisioning module 115 can be configured as described above to receive the location data.

The provisioning module 115 can be configured to receive a request to provision the smart device 120.

The provisioning module 115 can be configured to update—including adding if not already present—the physical location of the smart device 120 in response to the request to provision the smart device 120. The update can be based on the location data and the identification of the smart device 120.

Figure 2:
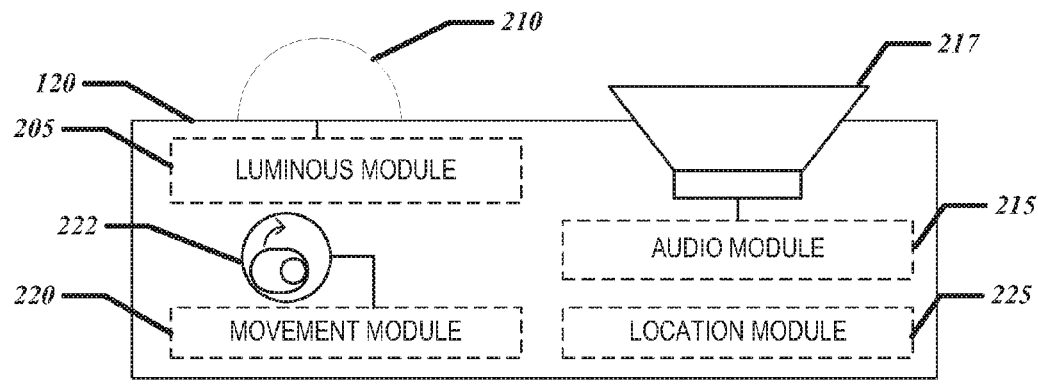
FIG. 2 illustrates an example of a smart device, according to an embodiment.

FIG. 2 illustrates an example of a smart device 120. The smart device 120 can include one or more of a luminous module 205, an audio module 215, a movement module 220, and a location module 225. The luminous module 205 can control a luminous element 210, such as a light emitting diode (LED), incandescent lamp, or other light-emitting element. The audio module 215 can control an audible element 217, such as a speaker. The movement module 220 can control a movement element 222, such as a vibrator.

The luminous module 205, audio module 215, and movement module 220, can be used to implement the identification action described with respect to FIG. 1. In an example, the identification action can include activating the luminous element 210, for example, via the luminous module 205. In an example, the identification action can include the flashing the luminous element 210. For example, the luminous module 205 can turn the power on and off to cause the luminous element 210 to emit light for a period of time, stop emitting light, and then resume emitting light. In an example, the flashing is irregular. Irregular flashing means that the periods of light are not always the same duration or the periods in which no light is emitted are not always the same duration.

In an example, the identification action can include activating the audible element 217, for example by the audio module 220. In an example, activating the audible element 217 can include causing a beep, chirp, music, or other audible signal to be emitted from the audible element 217.

In an example, the identification action can include activating the movement element 222, for example, by the movement module 220. In an example, activating the movement element 222 can include causing a vibrating acting in the smart device 120. In an example, activating the movement element 222 can include causing the smart device 120 to shift its physical position. In this example, the smart device 120 can jump, or lurch, in a direction.

A smart device equipped with a location module 225 can provide its physical location data to the device management module 110. In an example, the location module 225 can include a GPS receiver. In this example, the smart device 120 can use the location module 225 to determine its geographical coordinates and report those coordinates to the device management module 110. In an example, the location module 225 can determine an elevation for the smart device 120, for example, by using an altimeter. In this example, the elevation can be reported to the device management module 110. In an example, the device management module 110 can use trilateration, triangulation, or other geometric forms to locate the smart device 120. For example, the device management module 110 can be interfaced with a radio network provider and determine distances from the smart device 120 to a plurality of radio towers based on received signal strength. These distances can then be used to trilaterate the geographic position of the smart device 120 relative to the known locations of the radio towers.

In an example, the location module 225 can include a reader to read markers in an environment. Example markers can include RFID tags, location beacons, or visual indications. In this example, the reader can scan the environment for a marker. The marker can be reported to the device management module 110. The device management module 110 can correlate the marker to a physical location for the smart device 120. For example, the smart device can be brought into a structure 145 where the smart device reads an RFID tag at the entrance. Another RFID tag can be read in the room 150 the smart device is ultimately placed. Each of these RFID tag readings can be communicated to the device management module 110. The device management module 110 can correlate the first RFID tag to the structure 145 and the second RFID tag to the room 150. Thus, the device management module 110 has recorded the room 150 as the physical location of the smart device 120. In this way, smart devices that include a location module 225 can continually update the device management module 110 of its physical location. In an example, the location module 225 can include an identification device configured to be read by environmental readers. For example, the identification device can be an RFID tag that is read by RFID readers in various physical locations. This example operates and reports much like the previous RFID example except that the RFID reader and tag positions—which is on the smart device 120 or in the environment—are switched.

Figure 3:
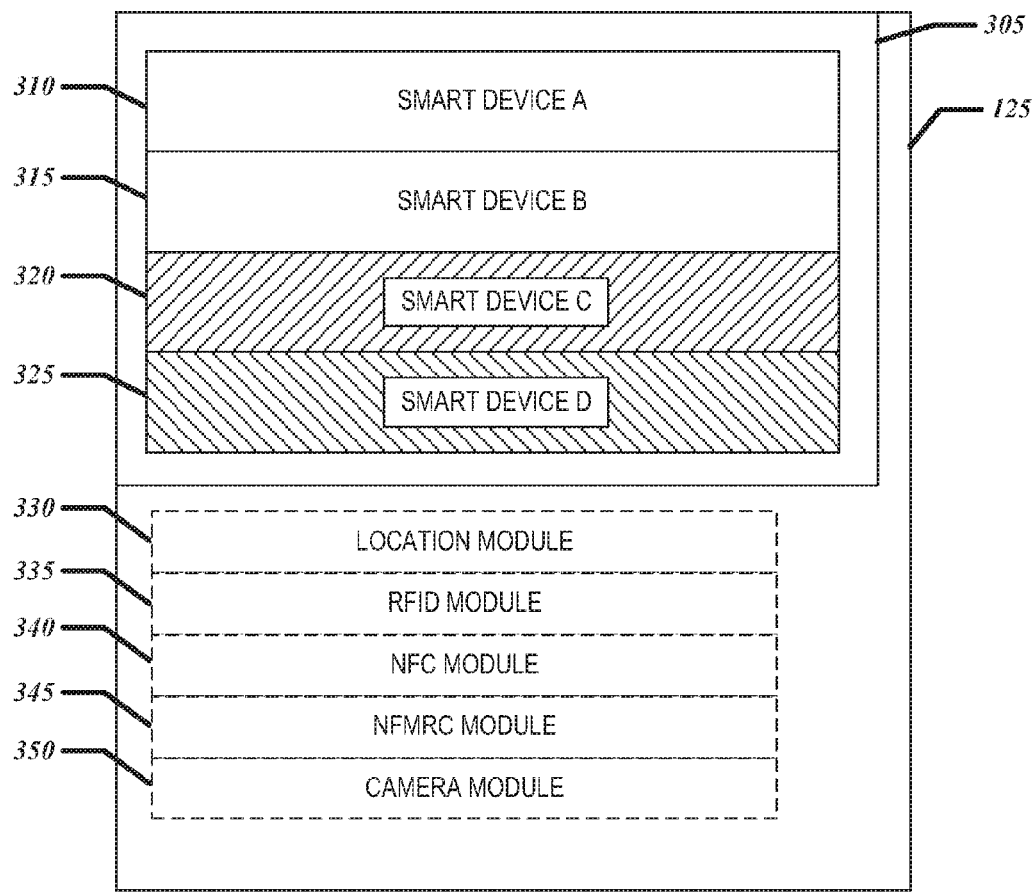
FIG. 3 illustrates an example of a configuration device, according to an embodiment.

FIG. 3 illustrates an example of a configuration device 125. The configuration device 125 can include a display 305 and a location module 330. In an example, the location module operates as described with respect to the location module 220 of FIG. 2. The configuration device 125 can also include one or more of an RFID module 335, an NFC module 340, an NFMRC module 345 and a camera module 350.

The configuration device 125 can allow a user 130 to provision one or more smart devices 120B, 120B, 120C, and 120D, as described with respect to FIG. 1. The display 305 can include respective representations 310, 315, 320, and 325 of these smart devices. As illustrated in FIG. 1, smart devices 120A and 120B are within the predetermined area 135. Thus, smart devices 120A and 120B are in the subset of smart devices. Thus, the display 305 can display representations 310 and 315 differently than representations 320 and 325. In an example, representations for smart devices not in the subset of smart devices (e.g., representations 320 and 325) are not display by the display 305. In this way, the configuration device 125 can be configured to present the subset of smart devices to the 130. In an example, a representation can include additional information about the smart device 120 it represents. This additional information can include such things as a model number, a serial number, a physical description, or an image of the smart device 120.

The user 130 can select a representation to select a smart device 120 to provision. For example, if display 305 is a touchscreen, the user 130 can tap on representation 310 to select smart device 120A to provision. In an example, the first selection of a smart device 120 by the user 130 is an initial selection. This initial selection can then invoke the provisioning module 115 to command the smart device 120 to perform an identification action as described with respect to FIGS. 1 and 2. Display 305 can provide a dialog, or other user interface element, requesting the 130 to confirm that the initially selected smart device 120 is the smart device the user 130 desires to provision. In this way, the user 130 can select a smart device 120, verify it is the correct device via the identification action, and confirm that this is the smart device that will be provisioned.

When the physical location of the smart 120 is unknown, the configuration device 125 can be configured to provide location information to the device management module 110 when provisioning the smart device. To facilitate this provisioning, one or more of the RFID module 335, the NFC module 340, the NFMRC module 345, and the camera module 350 can be used to identify the smart device. For example, the smart device 120 can include an RFID tag uniquely identifying the smart device 120. The RFID module 335 can be used by the configuration device 125 to interrogate the RFID tag and transmit the data as an electronic representation of the identification feature of the smart device. Similarly, the NFC module 340 and the NFMRC module 345 can be used to communicate with the smart device 120 to collect the electronic representation of an identification feature of the smart device 120. In an example, the identification feature is not electronic, but rather visual, such as a barcode or a serial number printed on the smart device's housing. In this example, the camera module 350 can photograph the identification feature. In an example, the photograph can be transmitted to the provisioning module 115 as the electronic representation of the identification feature. In an example, the configuration device 125 can be configured to interpret the photograph and extract the electronic representation of the identification feature. For example, the configuration device 125 can be configured to decode a photographed barcode and transmit the decoded data to the provisioning module 115. Other modules, such as a barcode scanner, can also be integrated in the configuration device 125 to create an electronic representation of an identification feature of the smart device 120.

Figure 4:
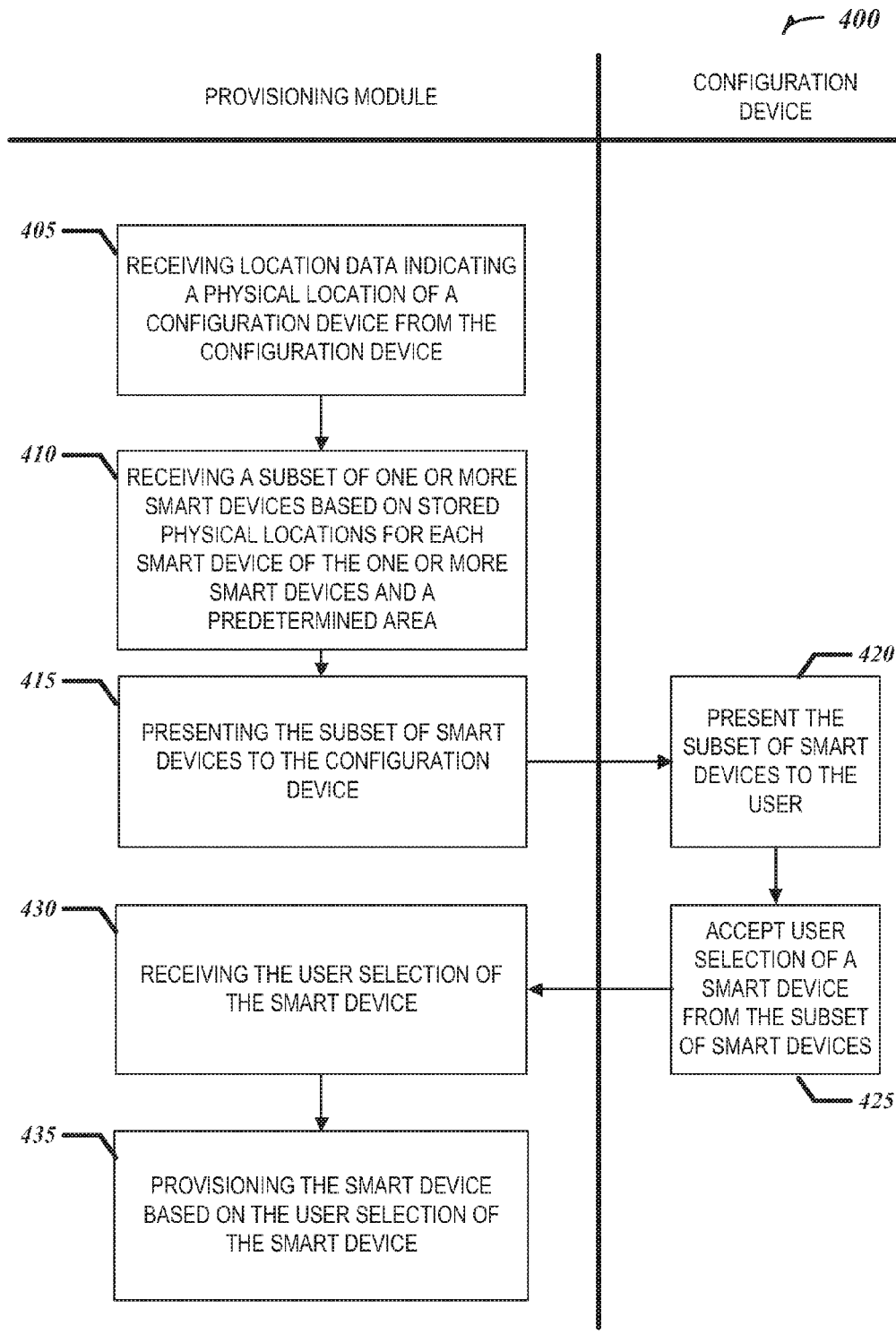
FIG. 4 illustrates an example of a method for spatially aware smart device provisioning, according to an embodiment.
Figure 5:
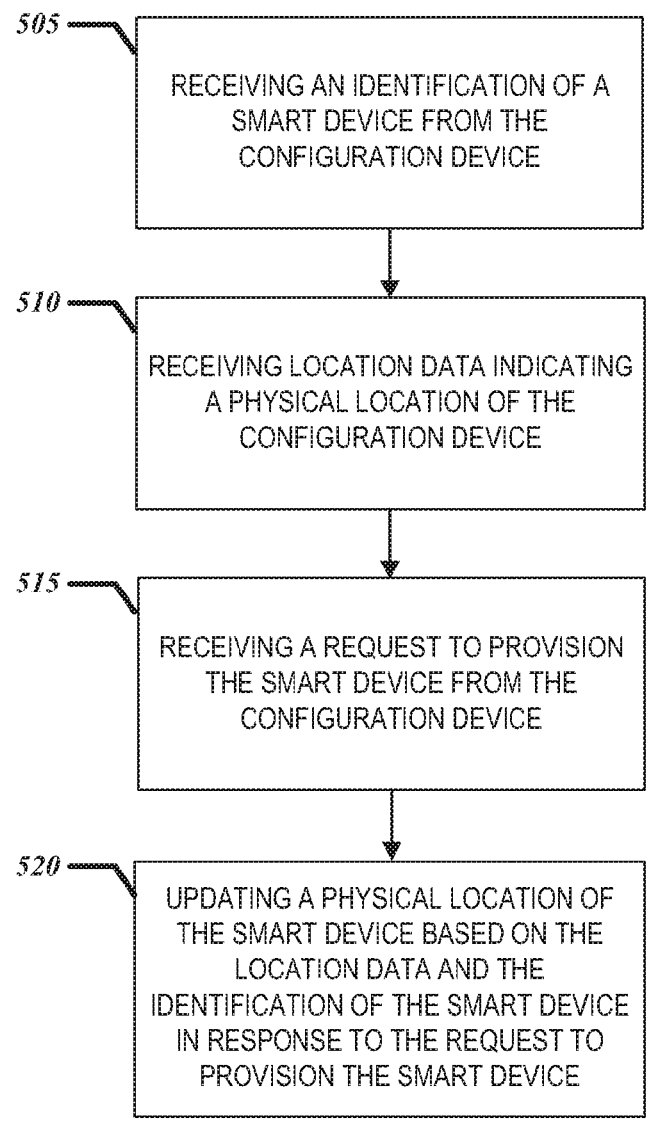
FIG. 5 illustrates an example of a method for spatially aware smart device provisioning, according to an embodiment.

One or more components described with respect to FIGS. 1-3 can be used to implement various operations of methods 400 and 500 described with respect to FIGS. 4 and 5. However, additional hardware or software running on hardware can substituted to perform the operations.

FIG. 4 illustrates an example of a method 400 for spatially aware smart device provisioning.

At operation 405, location data is received from a configuration device 125. The location data can indicate the physical location of the configuration device 125.

At operation 410, a subset of one or more smart devices can be received from the device management module 110. The subset of smart devices can be determined based on stored physical locations for each smart device of the one or more smart devices and a predetermined area 135.

At operation 415, the subset of smart devices is presented to the configuration device 125.

At operation 420, the configuration device 125 presents the subset of smart devices to a user 130. In an example, presenting the subset of smart devices to the configuration device 125 cab include receiving an initial selection from the configuration device 125. The initial selection can be an initial selection of the smart device 120 by the user 130. In an example, the initial selection can include elements described with respect to FIGS. 1 and 3. In an example, receiving the user selection of the smart device 120 can include receiving a confirmed selection from the configuration device 125. The confirmed selection can be a user confirmation of the initial selection.

In an example, a command can be transmitted to the smart device 120 initially selected to perform an identification action. In an example, the identification action can include activating a luminous element. In an example, the identification action can include flashing the luminous element. In an example, the identification action can include activating an audible element. In an example, the identification action can include activating a movement element. In an example, the identification action can include elements described with respect to FIGS. 1 and 2.

At operation 425, the configuration device 125 accepts a user selection of a smart device 120 from the subset of smart devices to provision.

At operation 430, the user selection of the smart device 120 is received.

At operation 435, the smart device 120 is provisioned based on the user selection of the smart device 120. In an example, provisioning the smart device 120 based on the user selection of the smart device 120 can include verifying that the configuration device 125 is within the predetermined area 135 before proceeding with a provisioning operation on the smart device 120.

In an example, the physical location (of either the configuration device 125 or a smart device 120) can include a geographical coordinate. In an example, the physical location can include an elevation. In an example, the physical location can include an identification of a structure 145. In an example, the physical location can include an identification of a structural feature 150 of the structure 145. In an example, the physical location can include elements described with respect to FIGS. 1-3.

FIG. 5 illustrates an example of a method 500 for spatially aware smart device provisioning.

At operation 505, an identification of a smart device 120 is received from a configuration device 125. In an example, the identification of the smart device 120 is an electronic representation of an identification feature of the smart device 120. In an example, the electronic representation of the identification feature is a photograph. In an example, the identification feature is a barcode. In an example, the identification feature is a serial number. In an example, the identification feature or the electronic representation of the identification feature can include elements described with respect to FIGS. 1-3.

At operation 510, location data indicating a physical location of the configuration device 125 is receive from the configuration device 125. In an example, the physical location can include a geographical coordinate. In an example, the physical location can include an elevation. In an example, the physical location can include an identification of a structure 145. In an example, the physical location can include an identification of a structural feature 150 within the structure 145. In an example, the physical location can include elements described with respect to FIGS. 1-3.

At operation 515, a request to provision the smart device 120 is received from the configuration device 125.

At operation 520, a physical location of the smart device 120 is updated based on the location data and the identification of the smart device 120 in response to the request to provision the smart device 120.

Figure 6:
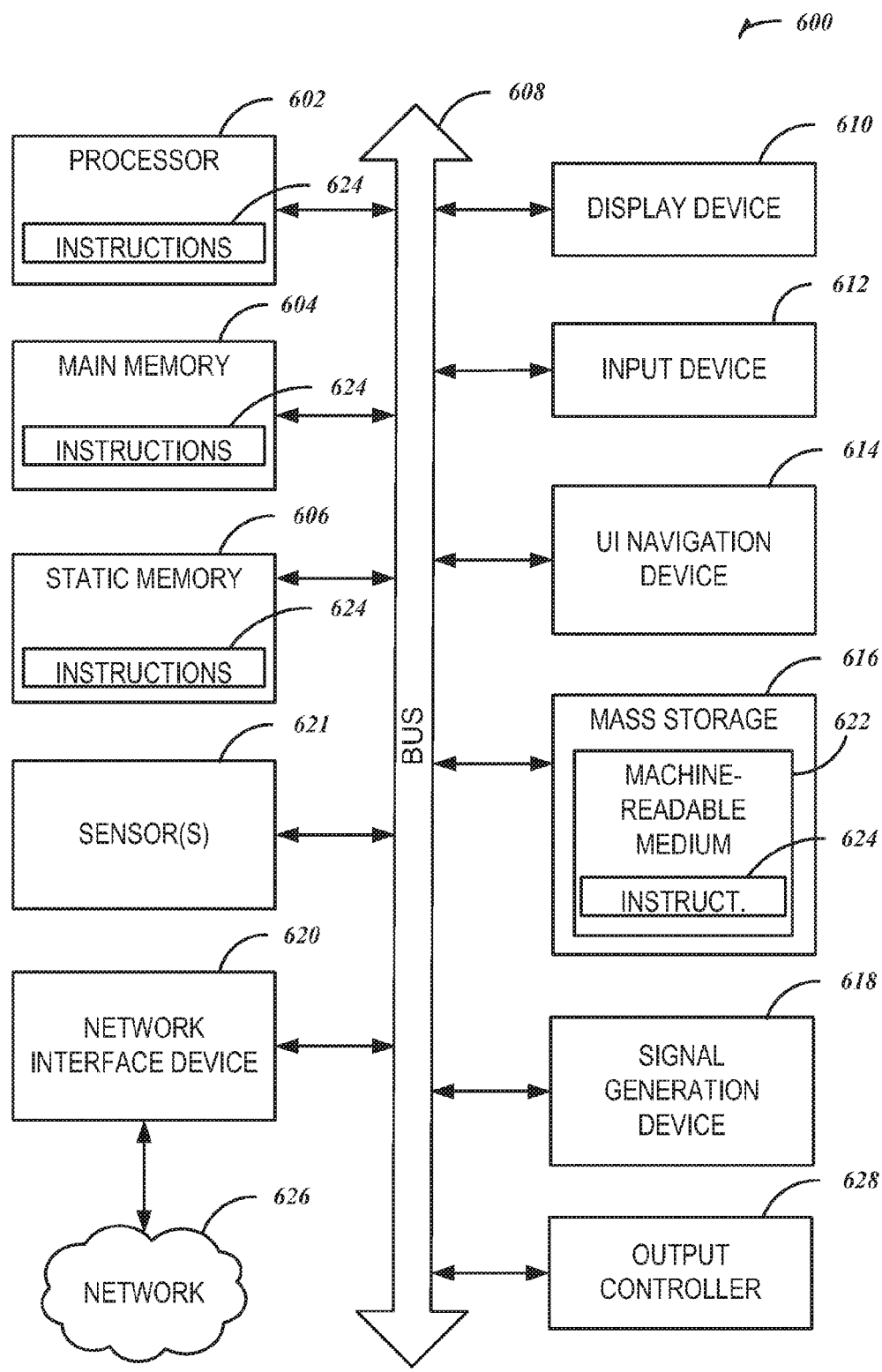
FIG. 6 is a block diagram illustrating an example of a machine upon which one or more embodiments can be implemented.

FIG. 6 illustrates a block diagram of an example machine 600 upon which any one or more of the techniques (e.g., methodologies) discussed herein can perform. In alternative embodiments, the machine 600 can operate as a standalone device or can be connected (e.g., networked) to other machines. In a networked deployment, the machine 600 can operate in the capacity of a server machine, a client machine, or both in server-client network environments. In an example, the machine 600 can act as a peer machine in peer-to-peer (P2P) (or other distributed) network environment. The machine 600 can be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate on, logic or a number of components, modules, or mechanisms. Modules are tangible entities (e.g., hardware) capable of performing specified operations and can be configured or arranged in a certain manner. In an example, circuits can be arranged (e.g., internally or with respect to external entities such as other circuits) in a specified manner as a module. In an example, the whole or part of one or more computer systems (e.g., a standalone, client or server computer system) or one or more hardware processors can be configured by firmware or software (e.g., instructions, an application portion, or an application) as a module that operates to perform specified operations. In an example, the software can reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor can be configured as respective different modules at different times. Software can accordingly configure a hardware processor, for example, to constitute a particular module at one instance of time and to constitute a different module at a different instance of time.

Machine (e.g., computer system) 600 can include a hardware processor 602 (e.g., a central processing unit (CPU), a graphics processing unit (GPU), a hardware processor core, or any combination thereof), a main memory 604 and a static memory 606, some or all of which can communicate with each other via a bus 608. The machine 600 can further include a display unit 610, an alphanumeric input device 612 (e.g., a keyboard), and a user interface (UI) navigation device 611 (e.g., a mouse). In an example, the display unit 610, input device 617 and UI navigation device 914 can be a touch screen display. The machine 600 can additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 can include an output controller 628, such as a serial (e.g., universal serial bus (USB), parallel, or other wired or wireless (e.g., infrared (IR)) connection to communicate or control one or more peripheral devices (e.g., a printer, card reader, etc.).

The storage device 616 can include a machine-readable medium 622 on which is stored one or more sets of data structures or instructions 624 (e.g., software) embodying or utilized by any one or more of the techniques or functions described herein. The instructions 624 can also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 can constitute machine readable media.

While the machine-readable medium 622 is illustrated as a single medium, the term "machine readable medium" can include a single medium or multiple media (e.g., a centralized or distributed database, and/or associated caches and servers) that configured to store the one or more instructions 624.

The term "machine-readable medium" can include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine-readable medium examples can include solid-state memories, and optical and magnetic media. In an example, a massed machine-readable medium comprises a machine-readable medium with a plurality of particles having resting mass. Specific examples of massed machine-readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 can further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), peer-to-peer (P2P)

networks, among others. In an example, the network interface device 620 can include one or more physical jacks (e.g., Ethernet, coaxial, or phone jacks) or one or more antennas to connect to the communications network 626. In an example, the network interface device 620 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

Additional Notes & Examples

Example 1 can include subject matter (such as a device, apparatus, or system) comprising a communications module configured to communicate with a configuration device and one or more smart devices, a device management module configured to store a physical location for each of the smart devices, and a provisioning module. The provisioning module can be configured to receive, from the configuration device via the communications module, location data indicating a physical location of the configuration device, receive, from the device management module, a subset of the smart devices based on the stored physical location for each of the smart devices and a predetermined area, the physical location of the configuration device being located within the predetermined area, present, via the communications module, the subset of smart devices to the configuration device, the configuration device configured to present the subset of smart devices to a user and accept a user selection of a smart device from the subset of smart devices to provision, receive the user selection of the smart device, and provision the smart device based on the user selection of the smart device.

In Example 2, the subject matter of Example 1 can optionally include, wherein to present the subset of smart devices to the configuration device, the provisioning module can be configured to receive an initial selection from the configuration device, the initial selection being an initial selection of the smart device by the user, and transmit a command to the smart device to perform an identification action.

In Example 3, the subject matter of Example 2 can optionally include, wherein the identification action is activating a luminous element.

In Example 4, the subject matter of Example 3 can optionally include, wherein the identification action includes flashing the luminous element.

In Example 5, the subject matter of one or more of Examples 2-4 can optionally include, wherein the identification action is activating an audible element.

In Example 6, the subject matter of one or more of Examples 2-4 can optionally include, wherein the identification action is activating a movement element.

In Example 7, the subject matter of one or more of Examples 2-6 can optionally include, wherein to receive the user selection of the smart device, the provisioning module can be configured to receive a confirmed selection from the configuration device, the confirmed selection being a user confirmation of the initial selection.

In Example 8, the subject matter of one or more of Examples 1-7 can optionally include, wherein to provision the smart device based on the user selection of the smart device, the provisioning module can be configured to verify that the configuration device is within the predetermined area before proceeding with a provisioning operation on the smart device.

In Example 9, the subject matter of one or more of Examples 1-8 can optionally include, wherein the physical location can include a geographical coordinate.

In Example 10, the subject matter of Example 9 can optionally include, wherein the physical location includes an elevation.

In Example 11, the subject matter of one or more of Examples 1-10 can optionally include, wherein the physical location can include an identification of a structure.

In Example 12, the subject matter of Example 11 can optionally include, wherein the physical location can include an identification of a structural feature of the structure.

Example 13 can include, or may optionally be combined with the subject matter of any one of Examples 1-12 to include, subject matter (such as a method, means for performing acts, or machine readable medium including instructions that, when performed by a machine cause the machine to performs acts) comprising receiving, from a configuration device, location data indicating a physical location of the configuration device, receiving, from a device management module, a subset of one or more smart devices based on stored physical locations for each smart device of the one or more smart devices and a predetermined area, presenting, to the configuration device, the subset of smart devices, the configuration device presenting the subset of smart devices to a user and accepting a user selection of a smart device from the subset of smart devices to provision, receiving the user selection of the smart device, and provisioning the smart device based on the user selection of the smart device.

In Example 14, the subject matter of Example 13 can optionally include, wherein presenting the subset of smart devices to the configuration device can include receiving an initial selection from the configuration device, the initial selection being an initial selection of the smart device by the user, and transmitting a command to the smart device to perform an identification action.

In Example 15, the subject matter of Example 14 can optionally include, wherein the identification action is activating a luminous element.

In Example 16, the subject matter of Example 15 can optionally include, wherein the identification action includes flashing the luminous element.

In Example 17, the subject matter of one or more of Examples 14-16 can optionally include, wherein the identification action is activating an audible element.

In Example 18, the subject matter of one or more of Examples 14-17 can optionally include, wherein the identification action is activating a movement element.

In Example 19, the subject matter of one or more of Examples 14-18 can optionally include, wherein receiving the user selection of the smart device includes receiving a confirmed selection from the configuration device, the confirmed selection being a user confirmation of the initial selection.

In Example 20, the subject matter of one or more of Examples 13-19 can optionally include, wherein provisioning the smart device based on the user selection of the smart device can include verifying that the configuration device is within the predetermined area before proceeding with a provisioning operation on the smart device.

In Example 21, the subject matter of one or more of Examples 13-20 can optionally include, wherein the physical location includes a geographical coordinate.

In Example 22, the subject matter of Example 21 can optionally include, wherein the physical location includes an elevation.

In Example 23, the subject matter of one or more of Examples 13-22 can optionally include, wherein the physical location can include an identification of a structure.

In Example 24, the subject matter of Example 23 can optionally include, wherein the physical location can include an identification of a structural feature of the structure.

Example 25 can include, or may optionally be combined with the subject matter of any one of Examples 1-24 to include, subject matter (such as a method, means for performing acts, or machine readable medium including instructions that, when performed by a machine cause the machine to performs acts) comprising receiving, from a configuration device using a module, location data indicating a physical location of the configuration device, receiving, from a device management module, a subset of one or more smart devices based on stored physical locations for each smart device of the one or more smart devices and a predetermined area, presenting, to the configuration device, the subset of smart devices, the configuration device presenting the subset of smart devices to a user and accepting a user selection of a smart device from the subset of smart devices to provision, receiving the user selection of the smart device, and provisioning the smart device based on the user selection of the smart device.

Example 26 can include, or may optionally be combined with the subject matter of any one of Examples 1-25 to include, subject matter (such as a device, apparatus, or system) comprising one or more smart devices, a configuration device, a communications module, a device management module, and a provisioning module. The communications module can be configured to present a subset of smart devices to a user, and accept a user selection of a smart device from the subset of smart devices to provision. The communications module can be configured to communicate with the configuration device and the one or more smart devices. The device management module can be configured to store a physical location for each of the smart devices. The provisioning module can be configured to receive, from the configuration device via the communications module, location data indicating a physical location of the configuration device, receive, from the device management module, the subset of the smart devices based on the stored physical location for each of the smart devices and a predetermined area, the physical location of the configuration device being located within the predetermined area, present, via the communications module, the subset of smart devices to the configuration device, the configuration device configured to present the subset of smart devices to a user and accept a user selection of a smart device from the subset of smart devices to provision, receive the user selection of the smart device, and provision the smart device based on the user selection of the smart device.

Example 27 can include, or may optionally be combined with the subject matter of any one of Examples 1-12 to include, subject matter (such as a device, apparatus, or system) comprising a communications module configured to communicate with a configuration device and a smart device, a device management module configured to store a physical location for the smart device, and a provisioning module. The provisioning module can be configured to receive, from the configuration device via the communications module, an identification of the smart device, receive, from the configuration device via the communications module, location data indicating a physical location of the configuration device, receive, from the configuration device via the communications module, a request to provision the smart device, and update, in response to the request to provision the smart device, the physical location of the smart device based on the location data and the identification of the smart device.

In Example 28 the subject matter of Example 27 can optionally include, wherein the identification of the smart device is an electronic representation of an identification feature of the smart device.

In Example 29 the subject matter of Example 28 can optionally include, wherein the electronic representation of the identification feature is a photograph.

In Example 30, the subject matter of one or more of Examples 28-29 can optionally include, wherein the identification feature is a barcode.

In Example 31, the subject matter of one or more of Examples 28-30 can optionally include, wherein the identification feature is a serial number.

In Example 32, the subject matter of one or more of Examples 27-31 can optionally include, wherein the physical location includes a geographical coordinate.

In Example 33, the subject matter of Example 32 can optionally include, wherein the physical location includes an elevation.

In Example 34, the subject matter of one or more of Examples 27-33 can optionally include, wherein the physical location includes an identification of a structure.

In Example 35, the subject matter of Example 34 can optionally include, wherein the physical location can include an identification of a structural feature within the structure.

Example 36 can include, or may optionally be combined with the subject matter of any one of Examples 1-35 to include, subject matter (such as a method, means for performing acts, or machine readable medium including instructions that, when performed by a machine cause the machine to performs acts) comprising receiving, from a configuration device, an identification of a smart device, receiving, from the configuration device, location data indicating a physical location of the configuration device, receiving, from the configuration device, a request to provision the smart device, and updating, in response to the request to provision the smart device, a physical location of the smart device based on the location data and the identification of the smart device.

In Example 37, the subject matter of Example 36 can optionally include, wherein the identification of the smart device is an electronic representation of an identification feature of the smart device.

In Example 38, the subject matter of Example 37 can optionally include, wherein the electronic representation of the identification feature is a photograph.

In Example 39, the subject matter of one or more of Examples 37-38 can optionally include, wherein the identification feature is a barcode.

In Example 40, the subject matter of one or more of Examples 37-39 can optionally include, wherein the identification feature is a serial number.

In Example 41, the subject matter of one or more of Examples 36-40 can optionally include, wherein the physical location includes a geographical coordinate.

In Example 42, the subject matter of Example 41 can optionally include, wherein the physical location includes an elevation.

In Example 43, the subject matter of one or more of Examples 36-42 can optionally include, wherein the physical location includes an identification of a structure.

In Example 44, the subject matter of Example 43 can optionally include, wherein the physical location includes an identification of a structural feature within the structure.

Example 45 can include, or may optionally be combined with the subject matter of any one of Examples 1-44 to include, subject matter (such as a method, means for performing acts, or machine readable medium including instructions that, when performed by a machine cause the machine to performs acts) comprising. A method comprising:
receiving, from a configuration device using a module, an identification of a smart device;
receiving, from the configuration device, location data indicating a physical location of the configuration device;
receiving, from the configuration device, a request to provision the smart device; and
updating, in response to the request to provision the smart device, a physical location of the smart device based on the location data and the identification of the smart device.

Example 46 can include, or may optionally be combined with the subject matter of any one of Examples 1-12 to include, subject matter (such as a device, apparatus, or system) comprising. A system comprising:
a smart device;
a configuration device;
a communications module configured to communicate with the configuration device and the smart device;
a device management module configured to store a physical location for the smart device; and
a provisioning module configured to:
receive, from the configuration device via the communications module, an identification of the smart device;
receive, from the configuration device via the communications module, location data indicating a physical location of the configuration device;
receive, from the configuration device via the communications module, a request to provision the smart device; and
update, in response to the request to provision the smart device, the physical location of the smart device based on the location data and the identification of the smart device.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A system comprising:
at least one processor remotely located from a configuration device and a smart device, the at least one processor separated from the configuration device and the smart device by at least one network, wherein the at least one network includes a wireless network, the at least one processor configured to:
communicate with the configuration device and the smart device;
store a physical location for the smart device;
receive, from the configuration device, an identification of the smart device;
receive, from the configuration device, location data indicating a physical location of the configuration device;
receive, from the configuration device, a request to provision the smart device; and
update, in response to the request to provision the smart device, the physical location of the smart device based on the location data and the identification of the smart device.

2. The system of claim 1, wherein the identification of the smart device is an electronic representation of an identification feature of the smart device.

3. The system of claim 2, wherein the electronic representation of the identification feature is a photograph.

4. The system of claim 2, wherein the identification feature is a barcode.

5. The system of claim 2, wherein the identification feature is a serial number.

6. The system of claim 1, wherein the physical location includes a geographical coordinate.

7. The system of claim 6, wherein the physical location includes an elevation.

8. The system of claim 1, wherein the physical location includes an identification of a structure.

9. The system of claim 8, wherein the physical location includes an identification of a structural feature within the structure.

10. A non-transitory machine-readable medium includes instruction which, when executed by at least one machine, cause the at least one machine to perform operations comprising:
   receiving, from a configuration device through at least one network, wherein the at least one network includes a wireless network, an identification of a smart device, the configuration device and the smart device remotely located from the at least one machine and separated from the at least one machine by the at least one network;
   receiving, from the configuration device, location data indicating a physical location of the configuration device;
   receiving, from the configuration device, a request to provision the smart device; and
   updating, in response to the request to provision the smart device, a physical location of the smart device based on the location data and the identification of the smart device.

11. The non-transitory machine-readable medium of claim 10, wherein the identification of the smart device is an electronic representation of an identification feature of the smart device.

12. The non-transitory machine-readable medium of claim 11, wherein the electronic representation of the identification feature is a photograph.

13. The non-transitory machine-readable medium of claim 11, wherein the identification feature is a barcode.

14. The non-transitory machine-readable medium of claim 11, wherein the identification feature is a serial number.

15. The non-transitory machine-readable medium of claim 10, wherein the physical location includes a geographical coordinate.

16. The non-transitory machine-readable medium of claim 15, wherein the physical location includes an elevation.

17. The non-transitory machine-readable medium of claim 10, wherein the physical location includes an identification of a structure.

18. The non-transitory machine-readable medium of claim 17, wherein the physical location includes an identification of a structural feature within the structure.

19. A method comprising:
   receiving, across at least one network and from a configuration device at at least one processor, an identification of a smart device, wherein the at least one network includes a wireless network, the configuration device and the smart device remotely located from the at least one processor and separated from the at least one processor by the at least one network;
   receiving, from the configuration device, location data indicating a physical location of the configuration device;
   receiving, from the configuration device, a request to provision the smart device; and
   updating, in response to the request to provision the smart device, a physical location of the smart device based on the location data and the identification of the smart device.

20. A system comprising:
   a smart device;
   a configuration device;
   at least one processor remotely located from the configuration device and the smart device, the at least one processor separated from the configuration device and the smart device by at least one network, wherein the at least one network includes a wireless network, the at least one processor configured to:
   communicate with the configuration device and the smart device;
   store a physical location for the smart device;
      receive, from the configuration device, an identification of the smart device;
      receive, from the configuration device, location data indicating a physical location of the configuration device;
      receive, from the configuration device, a request to provision the smart device; and
      update, in response to the request to provision the smart device, the physical location of the smart device based on the location data and the identification of the smart device.

* * * * *